Oct. 6, 1953
C. G. SERIGHT
IMAGE REGISTRATION IN COLOR TELEVISION SYSTEMS OR THE LIKE
Filed Dec. 22, 1950
2,654,854

INVENTOR
CARL G. SERIGHT
BY
ATTORNEY

Patented Oct. 6, 1953

2,654,854

UNITED STATES PATENT OFFICE 2,654,854

IMAGE REGISTRATION IN COLOR TELEVISION SYSTEMS OR THE LIKE

Carl G. Seright, Trenton, N. J., assignor to Radio Corporation of America, a corporation of Delaware Application December 22, 1950, Serial No. 202,161

4 Claims. (Cl. 315—26)

This invention relates to image registration circuits for color television systems, stereoscopic systems, or the like, in which a plurality of kinescopes is used, and in particular it relates to electronic circuits for centering the magnetically deflected electron beam in a cathode ray tube.

In color television systems, or the like, it is often desirable to superimpose information from several cathode ray tubes, representing different color or other signal components, so that the resulting composite image has the desired characteristics. Although the invention is useful in any system with superimposed images, it will be described hereinafter in combination with a color television system, for purposes of simplicity.

The shape of the color image on each cathode ray tube screen is determined by the mechanical alignment of the electron gun and the positioning of the deflection coils about the neck of the tube. In general, the shape of the color image varies from tube to tube. As a result it is difficult to superimpose color information from several cathode ray tubes so that the composite picture has the desired color fidelity. Even the provision of costly mechanical manipulation devices or the precise matching of kinescopes and deflection yokes does not give entirely satisfactory results. In addition the provision of extremely close manufacturing tolerances in the kinescopes and yokes is expensive. A large proportion of the image mis-alignment may be attributed to skew distortion, which may be defined as the difference of centering of different portions of a raster or image along the kinescope face which gives rise to the distortion of a rectangular raster into a parallelogram raster. In general, skew distortion may be attributed to two factors. First, it is difficult and expensive to precisely align the vertical and horizontal deflection windings in a deflection yoke such that their magnetic axes intersect each other at exactly 90°. Second, it is difficult and expensive to prevent stray coupling of deflection signal waveform applied to one set of deflection yoke windings to the other set of deflection yoke windings. Hence, in a television receiver, skew distortion of the television raster is often produced by modulation of horizontal deflection coil currents by vertical deflection coil currents. It would therefore be desirable to provide a simple electronic means for correcting alignment or skew distortions which cause misregistration of the color information.

Thus, it is an object of this invention to provide electronic means for obtaining proper image registration by skew correction in kinescope patterns.

It is another object of the invention to provide means for adjusting the skew of images on the screen of a magnetically deflected kinescope.

It is a further object of the invention to provide a simplified image registration control circuit which is inexpensive to manufacture.

It is a general object of the invention to provide a system affording excellent image registration in color television systems, or the like, using a plurality of cathode ray tubes.

In accordance with the invention there is, therefore, provided an improved centering control circuit which affords skew distortion correction. Thus, a pair of deflecting coil sections provided for deflecting the beam in one direction are differentially supplied with centering voltage, which is adjustable to change the amount of skew present. Exact superimposition of a plurality of differently colored images is thereby permitted without materially increasing the expense of manufacture.

The invention, together with further objects and advantages will best be understood from the following detailed description when considered in connection with the drawing in which.

Figures 1, 2:
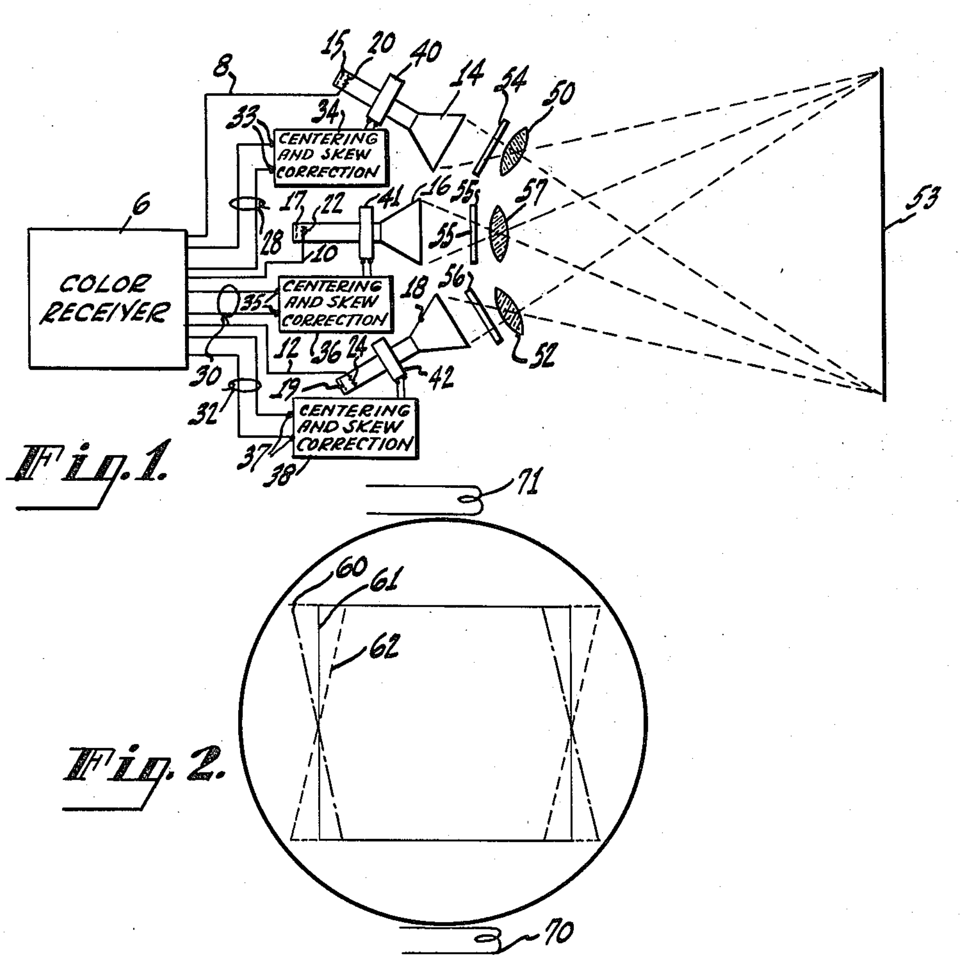
Figure 1 is a block diagram of a multi-tube color television system embodying the invention.
Figure 2 is a plan view of superimposed video color images illustrating the type of distortion which is corrected by the invention.

In Figure 1 a first block 6 represents a color receiver from which separate color video signals may be taken by means of the video output leads 8, 10 and 12. The signals are inserted at the control electrodes 20, 22 and 24 of three separate kinescopes or cathode ray tubes 14, 16 and 18 having the usual associated electron guns 15, 17 and 19.

Deflection signals are connected from the color receiver 6 to each of the kinescopes by means of the cables 28, 30 and 32. These cables are connected to the terminals 33, 35 and 37 of three separate centering and skew correction circuits 34, 36 and 38 (shown in block diagram). These centering and correction circuits are in turn connected to electromagnetic deflection yokes 40, 41 and 42 upon the corresponding kinescopes 14, 16 and 18. The deflection yokes may be either vertical or horizontal deflection yokes and it is hereby recognized that the invention and the following description is equally applicable in either case, although the description is limited, for simplicity sake, to horizontal deflection yokes.

Lenses 50, 51 and 52 are provided for superimposing images from the three kinescopes to provide a composite picture upon the screen 53. Appropriate color filters 54, 55 and 56 are illustrated for obtaining a colored composite image, by a system well known in the art. It is to be noted that the drawing is not to scale but is drawn to more clearly set out the present invention. Any other suitable superimposing system may be used for providing the composite picture upon the screen 53. The video information impressed upon each of the kinescopes 14, 16 and 18, in a system of the type shown, preferably contains video components corresponding to red, green and blue color information in the transmitted image.

Such superimposed information in the composite image may not, in the absence of a skew correction circuit in accordance with the present invention, be perfectly aligned. They will generally take a form such as that illustrated in Figure 2, wherein three superimposed raster images 60, 61 and 62 shown upon the screen of a single kinescope are mis-registered because of skew distortion. The distortion caused by mis-registration of the aforesaid color video components as seen upon different tubes causes poor color fidelity and color fringing.

It is noted that the information from the three figures is shown skewed in different directions. The amount of skew is, of course, random and is not generally as great as that shown in the drawing, which is exaggerated for purposes of clearly explaining the invention, but is enough to cause mis-registration and color fringing of the composite images. Poor color fidelity from such mis-registration is particularly noticeable at the outside edges of the picture or image.

It has been found that the skew distortion is caused because the beam, as it is being deflected across the face of the kinescope screen, requires a magnetic centering field of different magnitudes at different beam positions. This results because of failure of the horizontal and vertical magnetic deflection fields to occur at the same relative angles across the entire deflection path of the beam. Since the deflection coils of the three kinescopes cannot be easily maintained in perfect relative mechanical and electrical alignment, a certain amount of skew is almost certain to be imposed upon each video image portion. Therefore, in accordance with the invention there is provided a simplified electrical means for adjusting the skew at each kinescope so that the superimposed image portions may be perfectly registered.

It is only necessary to have the skew control in two of the usual three color channels. The skew present in the uncompensated channel can be allowed to remain provided the other two images are compensated to the same shape. Thus, in Figure 1, one of the skew correction circuits 34, 36 or 38 may be omitted if registration of the images only is desired. In general the distortion is not large enough to otherwise be objectionable and the skew would be tolerable if color fidelity were not affected.

Figure 3:
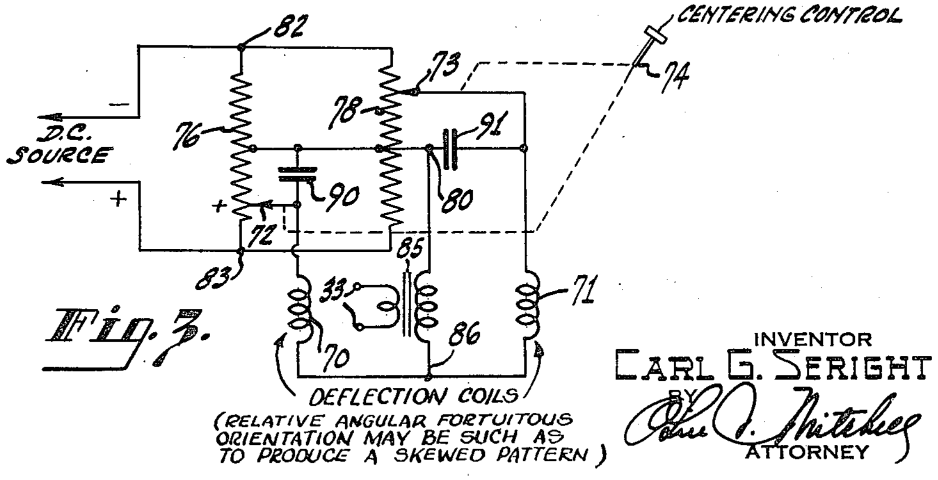
Figure 3 is a detailed schematic circuit diagram of a centering and skew correction circuit of the invention.

In Figure 3 is shown a detailed circuit for simply enabling both centering of the image on the kinescope screen and correcting the amount of skew therein. A horizontal deflection yoke is provided having a pair of deflecting coil sections 70 and 71, which may be mounted on opposite sides of the deflected beam. A coil section center tap or common connection terminal 80 is provided for serially connecting the coil sections 70 and 71. Skew correction is obtained by differentially feeding deflection current to the kinescope deflection coil sections 70 and 71. That is, one coil 70 is fed from a more positive voltage point with respect to the common connection 80 and the other coil 71 is fed from a more negative voltage point, as shown in the drawing.

The polarities need not necessarily be opposite in sense under all operating conditions however. In general, in the centering control operation, the two adjustable taps 72 and 73 are both adjusted simultaneously either in a positive or negative direction with respect to the center tap 80 to center the middle horizontal segment of the raster, which is not normally skewed. In some centering position therefore, both taps 72 and 73 may be negative or positive with respect to the common terminal when the correct skew is provided. The skew distortion then may be corrected by differentially and individually adjusting the taps 72 and 73 on the variable centering control resistors 76 and 78 with respect to the center tap 80. Thus, one tap is individually shifted in a positive direction and the other in a negative direction, to correct the skew without disturbing the centering of the horizontal central portion of the raster.

The variable adjustment permits a different polarity centering voltage with respect to the common deflection circuit lead terminal or center tap 80 to be connected across the pair of separate deflection coil sections 70 and 71. As hereinbefore discussed, the skew is caused by mis-alignment of the magnetic fields presented by the horizontal and vertical deflection yokes. It is clear therefore, that the vertical yoke could likewise be adjusted in a similar manner to correct skew distortion.

A suitable direct current (D.-C.) source provides the centering current available at the variable parallel connected centering control resistors 76 and 78, and is connected thereacross at the terminals 82 and 83. At an intermediate point upon each variable resistor, a common lead is connected with the common deflection coil terminal 80. The respective skew adjustment control taps 72 and 73 are electrically located upon opposite sides of the commonly connected intermediate tap of each resistor as represented by the common lead terminal 80, to clearly illustrate the differential nature of their separate adjustments.

It may therefore be recognized that the direct current centering component flowing through the deflection coils 70 and 71 may be adjusted so that the skew is properly compensated. Thus, as the electron beam approaches the upper or lower limit of its vertical deflection, the deflecting flux encountered from the more nearly adjacent horizontal deflection coil increases, while that encountered from the opposite horizontal deflection coil decreases. A nearly constant average centering across the entire tube face is thus attainable, whereby skew of the image is substantially eliminated.

At the center of the vertical sweep, the influence on the electron beam of the two horizontal deflection coil sections 70 and 71 is normally set to be equal for equal currents in each coil, since the two coils are designed to have equality of size, shape, and number of turns. To produce the magnetic field required to center the raster, it is merely necessary that the centering currents applied individually to the two horizontal deflection coil sections 70 and 71, by means of simultaneously adjusting the taps 72 and 73, have a vector voltage sum of proper magnitude and polarity. However, it is to be noted that as the electron beam is caused to approach either limit of its vertical deflection range, the deflection magnetic flux encountered from the more nearly adjacent horizontal deflection coil increases, while that from the opposite coil decreases. Thus, it is possible to differentially supply current to the deflecting coil sections so that, as the electron beam progressively approaches either limit of its vertical range of deflection, the horizontal centering field applied to the beam is caused to increase or decrease in the desired sense.

This method of supplying centering field current enables the raster shape to be changed to compensate for skew distortion as shown in Figure 2. Distortion such as is illustrated for raster 60 can be introduced in only two rasters 61 and 62, as explained above, to match the distortion in raster 60, thus causing the rasters to coincide. Likewise skew distortion may be eliminated from each raster causing registration to agree with raster 61. Therefore the skew may either be modified or nullified to cause registration of the images. As above explained, such is accomplished by applying unequal D.-C. centering voltages of suitable absolute magnitude and relative polarity to the two coil sections of a given deflection yoke winding.

Deflection voltages are inserted in the centering control circuit at the deflection transformer 85. This transformer 85 is serially connected from each deflection coil section 70 and 71 to the common connection 80 by the common deflection coil lead 86. Appropriate scanning circuits, or the like, may be connected at the transformer primary input terminals 33. The deflection voltage is bypassed about the D.-C. centering control resistor portions by capacitors 90 and 91.

Centering control taps 72 and 73 are ganged for uni-control operation, after the initial individual balancing adjustment of the respective taps 72 and 73 to correct the skew, as shown in the drawing by the dotted line 74.

Therefore, there is provided in accordance with the invention a skew correction and centering control circuit having the desired characteristics for providing correct image registration in a multiple tube color television system, or the like. The invention without the addition of expensive circuit elements, affords improved results. It is recognized that the invention is not limited to color television but may be used to obtain image registration in any cathode ray tube system wherein two or more images are superimposed, or with a single tube if skew distortion is objectionable.

What is claimed is:

1. In a cathode ray beam deflection system, in which an electromagnetic beam deflection yoke is employed for deflecting an electron beam such as to define a deflection raster, said yoke having a first and second deflection winding, each winding having two sections and the magnetic axes of said windings intersecting one another at such an angle, and the magnetic coupling between said windings being of such degree as to produce a skewed deflection raster, a skew correction arrangement comprising in combination: wave generating means connected with said deflection yoke for applying deflection signal to each section of said deflection windings, means connected with one of said windings for passing direct current through the sections thereof and means connected with said last named means and each winding section connected therewith for separately controlling the value of direct current passing through each of said winding sections.

2. In a cathode ray beam deflection system, in which an electromagnetic beam deflection yoke is employed for deflecting an electron beam so as to define a deflection raster, said yoke having a first and second deflection winding, each winding having two sections and the magnetic axes of said windings intersecting one another at such an angle, and the magnetic coupling between said windings being of such degree as to produce a skewed deflection raster, a skew correction arrangement comprising in combination: direct current power supply terminals across which is designated to appear a direct current voltage, a first and a second resistance means each connected in shunt with said power supply terminals, a connection between resistance means from substantially equipotential points thereon, said connection defining at least one reference terminal, connections placing one section of said first winding between said reference terminal and a point on said first resistance means and connections placing the other section of said first winding between said reference terminal and a point on said second resistance means.

3. A skew correction circuit according to claim 2 wherein there is additionally provided deflection wave-form generating means connected in series with each winding section at a point between each winding section and said reference terminal.

4. In a cathode ray beam deflection system, employing an electromagnetic beam deflection yoke having separate horizontal and vertical deflection windings, so related to one another as to produce a skewed deflection raster each coil winding comprising two sections, a skew correction circuit comprising in combination: a source of direct current power having a first and a second power supply terminal across which appears a direct current voltage, a first and a second tapped resistance means each connected in shunt with said power supply terminals, a movable direct connection from one tap on said first resistance means to one tap on said second resistance means, said direct connection defining a reference terminal, a movable tap on each of said resistance means, a separate capacitor connected from each of said movable taps to said reference terminal, deflection signal generating means having a first and a second output terminal, a connection from said first output terminal to said reference terminal, a connection from said second output terminal to one extremity of each section of a single yoke deflection winding, the remaining extremities of said yoke deflection winding sections each being connected to a separate one of said movable taps.

CARL G. SERIGHT.

References Cited in the file of this patent

UNITED STATES PATENTS

| Number | Name | Date |
|---|---|---|
| 2,064,469 | Haeff | Dec. 15, 1936 |
| 2,086,926 | Stocker | July 13, 1937 |
| 2,223,990 | Holmes | Dec. 3, 1940 |
| 2,280,733 | Tolson | Apr. 21, 1942 |
| 2,369,631 | Zanarini | Feb. 13, 1945 |
| 2,485,569 | Coughlin | Oct. 25, 1949 |
| 2,555,828 | Barco | June 5, 1951 |

FOREIGN PATENTS

| Number | Country | Date |
|---|---|---|
| 112,758 | Australia | Apr. 3, 1941 |

OTHER REFERENCES

Cathode Ray Tube Displays, Radiation Laboratory Series, McGraw-Hill, New York, 1948, page 506.